United States Patent
Hirn et al.

(10) Patent No.: US 6,815,482 B1
(45) Date of Patent: Nov. 9, 2004

(54) FILM WITH UV-BARRIER PROPERTIES

(75) Inventors: Thomas Wolfgang Friedrich Hirn, Weiterstadt (DE); Rached Menif, Neu-Anspach (DE)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

(21) Appl. No.: 09/831,610

(22) PCT Filed: Nov. 8, 1999

(86) PCT No.: PCT/US99/26341

§ 371 (c)(1),
(2), (4) Date: May 10, 2001

(87) PCT Pub. No.: WO00/27914

PCT Pub. Date: May 18, 2000

(30) Foreign Application Priority Data

Nov. 10, 1998 (EP) .............................. 98870246

(51) Int. Cl.$^7$ ................................................. C08K 3/00

(52) U.S. Cl. ...................... 524/359; 524/430; 524/432; 524/497

(58) Field of Search ................................ 524/359, 430, 524/432, 497

(56) References Cited

U.S. PATENT DOCUMENTS

| | | | |
|---|---|---|---|
| 4,423,164 A | | 12/1983 | Bar |
| 4,670,491 A | | 6/1987 | Stretanski et al. |
| 5,314,736 A | | 5/1994 | Kawaguchi et al. |
| 5,391,609 A | * | 2/1995 | Knoerzer et al. ............ 524/497 |
| 5,977,218 A | * | 11/1999 | Bonora .......................... 524/91 |

FOREIGN PATENT DOCUMENTS

| | | |
|---|---|---|
| EP | 0768277 A1 | 4/1997 |
| WO | WO 98/06575 | 2/1998 |

* cited by examiner

*Primary Examiner*—Edward J. Cain
(74) *Attorney, Agent, or Firm*—Stephen T. Murphy; David M. Weirich; Ken K. Patel

(57) ABSTRACT

The present invention is directed to a thin packaging film made out of a thermoplastic material with anti-UV properties, characterized in that its composition further comprises a combination of at least one organic compound with at least one inorganic UV-absorbent compound, for improved barrier against UV rays, and improved transparency. Preferably, the organic compound is a benzotriazole, and the inorganic compound is micronized zinc oxide. More preferably, the material for the film further comprises a binder compound, for example a benzophenone, in order to improve the compatibility between the organic component and the base-resin. Preferably, the film thickness is below 80 $\mu$m, more preferably below 35 $\mu$m.

16 Claims, No Drawings

US 6,815,482 B1

FILM WITH UV-BARRIER PROPERTIES

FIELD OF THE INVENTION

The present invention relates to a plastic film with UV-barrier properties and improved transparency.

BACKGROUND OF THE INVENTION

Packaging wrapping thermoplastic films are representative of the various thermoplastic films to which the present invention can apply; such films typically have a thickness below 80 $\mu$m, preferably below 35 $\mu$m, and are made out of at least one layer of thermoplastic material, which is extruded. They can also be oriented, in one or more direction(s) in order to achieve specific properties, for example, easy-tearing in one preferred direction. Such films are typically used for packaging purposes, for example in wrap-around packing of products, or for the making of pallets, to hold the stacked products. Such packaged products are sometimes exposed during a period of time to natural or artificial light, for example during storage, or in store's shelves. Some of the rays constitutive of the light can alter or even degrade the structure of the packaged product. In particular, cellulose-based products are particularly sensitive to rays near the UV wavelengths, and get yellow or brown when exposed to direct or diffuse UV light.

Some films have been developed which incorporate UV-absorbing compounds, for protecting the package contents.

Some films contain inorganic compounds like metal oxides, such as for example Titanium dioxide ($TiO_2$), or Zinc oxide (ZnO). Such films are efficient in filtering a large range of the UV rays. However, a major drawback is that $TiO_2$ gives an opaque white color to the film. In some applications, for example when the packaged product must be visible from the outside, for example by a consumer when looking at the shelves, then such films cannot be used. A solution to limit this opacity is to have micronized compounds. Non-micronized $TiO_2$ particles (crystals) have a grain size around 1 $\mu$m, that agglomerate to even bigger sizes. This means they deliver a "white" color by scattering and reflecting the light. Micronized $TiO_2$ has a reduced grain size of about 20 nm, which results also in smaller agglomerates. A disadvantage is: by reducing the reflection and scattering effect there are also losses in terms of UV protection since light protection is due to absorption and reflection (scattering).

Some films are colored with yellow pigments which are either added into the thermoplastic material, or at the surface of the film as a coating. Such yellow films are particularly efficient in filtering the violet part of the visible light and protecting the contents from degradation, however, some applications require that the film be transparent and not colored, for example when packaging colored products, or food: in such cases, the consumer must be able to see the real color of the product.

Some films have been developed which feature UV-absorbing properties, and have a transparent color. Such transparent films are achieved by using polar organic compounds which have UV-absorbing properties while remaining transparent when added to a plastic film composition. However, a major drawback of such organic compounds is their low stability in an apolar thermoplastic base resin. In other words, such organic compounds are very likely to migrate into a homogeneous thermoplastic layer, so that the film shows a greasy surface and loses some of its UV-absorbing properties, which is clearly undesirable to the consumer. The solution which is generally used to counter-balance this poor stability is to make films which comprise several layers. Typically, the layer comprising the organic UV-absorbing compound is made of polar thermoplastics such as PET (polyethylene terephtalate) or PEN (polyethylene naphtalate) and sandwiched between two other layers so that said organic compound cannot escape, because organic compounds are polar and PET/PEN are apolar compounds. In this way, the film is more likely to keep its UV-absorbing properties. Such films are however quite expensive to manufacture, due to the complex process to make the several layers.

As for organic compounds, it has been shown that benzotriazoles are efficient for stopping rays whose wavelength is comprised within the range of 300 to 370 nm, while benzophenones are efficient to stop rays with a wavelength comprised within 300 to 400 nm. As for inorganic compounds, micronized metal oxides ($TiO_2$/ZnO) prove to be efficient against UV rays in a wavelength range comprised between 200 and 320 nm. White cellulose-based products show degradation and yellowing when exposed to rays whose wavelength is typically comprised within the UV range.

One main object of the present invention is to provide a thermoplastic film with improved UV-absorbing properties, with a low thickness suitable for the purpose of packaging, which is transparent, non-colored and clear, which is inexpensive and easy to manufacture, and whose UV-absorbing properties are substantially constant over a long period of time.

SUMMARY OF THE INVENTION

The present invention is directed to a film made out of a thermoplastic material with UV-absorbing properties, characterized in that its composition further comprises a combination of at least one UV-absorbent organic compound with at least one inorganic UV-absorbent compound, for improved barrier against UV rays. Preferably, the organic compound is a benzotriazole, and the inorganic compound is micronized titanium dioxide. More preferably, the film's material further comprises a binder compound, for example a benzophenone, in order to improve the compatibility between the organic component and the base-resin. Preferably, the film thickness is below 80 $\mu$m, more preferably below 35 $\mu$m.

DETAILED DESCRIPTION OF THE INVENTION

The Base Resin

A film is provided which can comprise several layers, but preferably comprises one single layer. Said layer comprises a base material which is chosen amongst the wide variety of thermoplastic compounds, to which additives are preferably added, for example colorants. The base resin used for making the film is an apolar thermoplastic resin such as polyethylene, polypropylene, or combination of such resins, but it is preferably made out of polyethylene only, more preferably a low density polyethylene (LDPE). Alternatively, in another embodiment of the invention, it can be used in combination with other layers to make a multi-layer material. In a preferred embodiment of the present invention, the film is made of three layers of an LDPE resin, the middle layer comprising the anti-UV absorbers mixed with LDPE, and the external layers comprising only LDPE, so that the whole film is monomaterial.

The UV Absorbers

The film of the present invention further comprises organic and inorganic UV absorbers which are added to the base resin before manufacturing the film. Indeed, a combination of these two types of compounds leads to synergistic effects and improved UV-absorbing properties. It has further been shown that the highest protection contribution comes from the organic absorber, while the inorganic absorbers, when used alone, play a minor role in terms of prevention of UVs transmission through the film. The resulting global absorption which is obtained is comprised within a range of wavelengths comprised between 280 and 390 nm, and is maximum between 300 and 370 nm.

The polar organic UV absorbers which are preferably used in the film according to the present invention comprise compounds of the benzotriazoles chemical family, more preferably compounds of the 2-(2'-hydroxyphenyl)-benzotriazole class, such as for example: 2-(2'-hydroxy-5'-methylphenyl)-benzotriazole, 2-(2'-hydroxy-3'-5'-di-tert.-butylphenyl)-benzotriazole, 2-(2'-hydroxy-3'-5'-di-tert-butylphenyl)-5-chlorobenzotriazole. Benzotriazole shows a good absorption in the range between 300 and 370 nm. A major disadvantage of this absorber is its migration effect that leads to a greasy surface.

Micronized titanium dioxide ($TiO_2$) is another compound which is also added into film composition for its UV-absorbing properties. There are two different types of such metal oxides which differ in the size of the crystals. Non-micronized $TiO_2$ particles (crystals) have a grain size around 1 μm, that agglomerate to even bigger sizes. This means they are detectable by visible light and deliver a "white" color by scattering and reflecting the daylight. Such properties are clearly undesirable for achieving good transparency in the film, as required by the present invention. The micronized $TiO_2$ we used has a grain size of about 20 nm, which results also in smaller agglomerates. The thinking behind is, to drive the grain (i.e. agglomerate) size as far as possible out of the visible range to reduce the film opacity but keep, using the micronized grade, the absorption properties in the UV wavelengths. Disadvantage is by reducing the reflection and scattering effect there are also losses in terms of UV protection since light protection is due to absorption and reflection (scattering).

Any type of micronized metal oxides may be used in the composition of the film according to the present invention, however, the metal oxide is preferably a micronized titanium dioxide, or a micronized zinc oxide (ZnO).

The big advantage of micronized $TiO_2$ is that it does not migrate in the base material and that the physical properties of the film, such as for example the friction coefficient and the surface energy are not substantially modified. These physical properties makes micronized metal oxides such as $TiO_2$, very useful in combinations with other UV absorbers.

The Binder

Polar organic UV absorbers are widely used as additives to plastic film compositions, however, a major drawback is their poor stability in the apolar thermoplastic resins. This poor stability typically leads to migration of the polar organic UV absorber from the inside of the layer, to its surface, and can easily be recognized by a greasy touch of the film. This migration also and more importantly leads to loss of the film's UV-barrier properties.

As previously explained, due to the poor solubility of benzotriazoles in the thermoplastics, the benzotriazole migrate to the surface of the film. This leads to loss of protection properties, as well as a greasy aspect of the film.

In a first embodiment of the invention, the UV absorbing properties of the film are achieved by adding benzotriazoles in combination with a micronized metal oxide for synergistic and improved barrier properties, to the thermoplastic base resin of the film.

In a second and preferred embodiment of the present invention the film comprises benzotriazoles in combination with a micronized metal oxide for synergistic and improved barrier properties, together with a binder which reduces the migration of the benzotriazole in the thermoplastic resin. Preferably, the binder is a benzophenone, more preferably an hydroxy-benzophenone. Benzophenone compounds are other organic chemicals which may be used for their UV-absorbing properties. Benzophenone shows a higher transmission in the range between 300 and 400 compared to benzotriazoles (i.e. their UV-barrier properties are lower than those of benzotriazoles), however they are more stable than benzotriazoles in the thermoplastic base compound, which is a clear advantage over the benzotriazoles-type compounds. While benzophenones, when used alone, show UV-absorbing properties, they will essentially be used in the present invention to increase the solubility of the benzotriazoles inside the thermoplastic base resin, i.e. as binder of said benzotriazoles to said thermoplastic resin.

Most preferably the binder is chosen within the following compounds: 2,4-dihydroxybenzophenone; 2,2',4-trihydroxybenzophenone; 2,2',4,4'-tetra-hydroxybenzophenone; 2-hydroxy-4-octoxybenzophenone. The absorption range of such compounds is extended due to the hydroxy group, while no substantial discoloration of the substrate can be observed.

A preferred embodiment of the present invention is obtained with a film comprises 3 layers, the anti-UV absorbing compounds being comprised inside the middle layer, and the external layers comprising only the thermoplastic base resin, which is more preferably LDPE. The film is composed of: organic absorber/binder/inorganic absorber which are melted respectively in a 0.3/0.6/1.0% in mass of film. The organic absorber is the 2-(2'-hydroxy-3'-5'di-tert-butylphenyl)-5-chlorobenzotriazole; the inorganic absorber is a micronized metal oxide, preferably titanium dioxide or zinc oxide, and more preferably zinc oxide since ZnO provides absorbent properties which are equivalent to the absorbent properties of titanium dioxide, while providing better clarity of the film for a same concentration. The binder—which makes the organic UV absorber more soluble in the thermoplastic resin—is a benzophenone-type compound, preferably the 2,4-dihydroxybenzophenone. While the above mentioned composition in percentages is given as an example, it is to be understood that this composition can vary, according to the properties which are required.

The Manufacturing Process

Any suitable process shall be used which allows to manufacture a film as described in the present application, for example extrusion or extrusion-blowing can be used, which are processes for making plastic films well known in the art. The film can also be oriented in one or more directions, so as to achieve specific mechanical properties, for example tearing properties in one or more preferred directions.

In one preferred embodiment, the manufacturing process comprises the following steps: (a) melting granules of UV absorbers and binder, if any, together with a small amount of granules of thermoplastic base resin, so as to form a masterbatch; (b) melting the granules of masterbatch and the granules of thermoplastic base resin together in certain proportions, so as to obtain the polymer material; (c) introducing said polymer material inside an extruder, so has to obtain a molten polymer. Preferably, at least two extruders are used for further forming at least two different layers; (d) flow the molten polymer from the extruder round the mandrel of a die, and then through a ring shaped die opening, so as to extrude, preferably vertically, said molten polymer in the shape of a tube. Preferably in the present invention, the die and ring are designed such that the tube which is extruded comprises 3 layers, the middle one containing the molten polymer with masterbatch, and the external layers containing only the thermoplastic resin—without UV absorbers; (e) expand the tube into a vertical elongated bubble of the required diameter by an air pressure maintained through the center of the mandrel. The expansion of the bubble is accompanied by a corresponding reduction of its thickness. The bubble pressure is maintained by the die at the proximal end of said bubble, and by pinch rolls at its distal end. It is important that the air pressure is constant, as well as extruder output, haul-off speed, and temperatures of the die, so as to ensure uniformity of the bubble's thickness; (f) after the melt is solidified and stabilized into the fully dense bubble, the film is drawn vertically upward and folded into a flattened tube, which is preferably electric corona surface-treated, for ink or glue adhesion enhancement; (g) the collapsed tube is then edge trimmed, or slit at the crease to separate the two thicknesses. It can also be folded and/or glued or sealed directly to make bags or other elaborated items.

The Contents

The above film is typically to be used in any application such as protection of agricultural goods for example, but preferably as a packaging film, using flow-wrapping, or folding, and hot or cold sealing, for making bags or sachets. It can also be manufactured as a shrink film. But it is preferably to be used in wrap-around process for constituting multipacks or pallets of UV sensitive products such as cellulose-based products, most preferably white cellulose-based products, such as paper rolls for household cleaning purposes. An example is the flow-wrapping of multipacks of 2 or more rolls of paper for household-cleaning purposes. Such a process typically comprises the steps of: (a) making a roll of film around the paper rolls by pushing said paper rolls (for example 2 of them) together through a flat film curtain whose right and left sides are movable, so that the paper rolls are covered by the film all around their periphery; (b) making a longitudinal seal for creating a cylinder of film around the paper rolls; (c) folding and sealing the top and bottom ends of the film cylinder, so as to close the package.

Such paper-based products are especially attractive to the consumer's eye due to their white color. Such products are typically stored after production in large areas exposed to natural or artificial light which causes yellowing. Such products when exposed to a light source which contains UV rays, i.e. rays with a wavelength comprised within the range of 280 to 435 nm, are damaged because their chemical structure is altered by the UVs. As a result, their color is changed and gets yellow or even brown. Such changes are clearly undesirable to the consumer, mostly in the case the color of the product is clear, for example white. Yellowing is not a linear process, that is to say, it does not depend only on one factor, for example the intensity of UV rays, or the UV wavelength, or on the time the product has been exposed to the light, but it also depends on different and combined factors besides radiation, such as humidity, temperature, or oxygen level.

Finally, it has been found that concentration and thickness of the film have a huge impact on the transmission properties of the film. Furthermore, the use of combined UV-absorbing compounds of a different chemical nature can achieve synergistic effects between them, which are clearly desirable as they allow to use lower amounts of chemicals into the film, thus leading to a cheaper film with similar, or even improved UV-absorbing properties. This is particularly true in the case of thin films, i.e. for films whose thickness is less than 80 $\mu$m, preferably less than 35 $\mu$m.

The film of the present invention is preferably primarily intended for such uses as packaging, and as such requires a low thickness and excellent transparency. More importantly, a low thickness requires less material, and thus leads to a film which is cheaper to produce. The film according to the present invention has a thickness of less than 80 $\mu$m, preferably a thickness which is below 35 $\mu$m.

The Advantages

The above described composition, and particularly the preferred composition which comprises organic and inorganic UV absorbers melted together with a binder, provide excellent transparency for a film with a thickness which is below 80 $\mu$m, preferably below 35 $\mu$m, which comprises 3 layers, the UV-absorbing compounds being contained inside the middle layer. The protective barrier which is achieved with such a thin film proved to reduce the discoloration of the film by 8 times compared to a non-protective film, under direct sunlight exposure in the central European countries.

The above described preferred composition which comprises organic and inorganic UV absorbers melted together with a binder delivers excellent properties of transparency. Indeed, such a composition provides a haze of less than 30%, preferably less than 20% for a 35 $\mu$m film, and/or less than 50%, preferably less than 40%, for a 70 $\mu$m film (haze measurements obtained according to ASTM 1003 method). Haze values are given in percentage of artificial light which is absorbed by the film, due to absorption or reflection.

What is claimed is:

1. A film made out of a thermoplastic material, characterized in that its composition further comprises a combination of at least one organic anti-UV compound, at least one inorganic anti-UV compound, and at least one chemical binder for improved solubility of the organic compound in said thermoplastic material.

2. A plastic film according to claim 1, wherein the thermoplastic material is low density polyethylene.

3. A plastic film according to claim 1, which is a mono-oriented film.

4. A plastic film according to claim 3, which is a bi-oriented film.

5. A plastic film according to claim 1, wherein the inorganic compound is a micronized metal oxide.

6. A plastic film according to claim 1, wherein the inorganic compound is micronized zinc oxide (ZnO).

7. A plastic film according to claim 5, wherein the inorganic compound is micronized titanium dioxide ($TiO_2$).

8. A plastic film according to claim 1, wherein the organic UV absorber compound is a benzotriazole.

9. A plastic film according to claim 8, wherein the benzotriazole organic UV absorber compound is comprised within the list of: 2-(2'-hydroxy-5'-methylphenyl)-benzotriazole, 2-(2'-hydroxy-3'-5'-di-tert.-butylphenyl)-benzotri-azole, 2-(2'-hydroxy-3'-5'-di-tert-butylphenyl)-5-chlorobenzotriazole.

10. A plastic film according to claim 1, wherein the binder is a benzophenone.

11. A plastic film according to claim 10, wherein the benzophenone binder is a 2,4-dihydroxybenzophenone.

12. A plastic film according to claim 1, which is a barrier for light with a wavelength comprised within the range of 280 to 390 nm.

13. A plastic film according to claim 1, which has a thickness of less than 80 μm.

14. A plastic film according to claim 1, whose haze is less than 30% for a 35 μm film.

15. The use of a plastic film according to claim 1, for packing consumer products by flow-wrapping.

16. The process of making a film according to claim 1, which is an extrusion blow molding process.

* * * * *